(No Model.)

F. CUMMING.
LATHE CHUCK AND ATTACHMENT FOR TURNING TREENAILS.

No. 385,793. Patented July 10, 1888.

Witnesses,
Inventor,
F. Cumming.
By Dewey & Co.
Attys.

UNITED STATES PATENT OFFICE.

FINDLAY CUMMING, OF SAN FRANCISCO, CALIFORNIA.

LATHE-CHUCK AND ATTACHMENT FOR TURNING TREENAILS.

SPECIFICATION forming part of Letters Patent No. 385,793, dated July 10, 1888.

Application filed September 6, 1887. Serial No. 248,981. (No model.)

*To all whom it may concern:*

Be it known that I, FINDLAY CUMMING, of the city and county of San Francisco, State of California, have invented an Improvement in Lathe Chucks and Attachments for Turning Treenails; and I hereby declare the following to be a full, clear, and exact description of the same.

My invention relates to an improved device for turning treenails and similar articles; and it consists in certain details in connection with a lathe, which will be more fully explained by reference to the accompanying drawings, in which—

Figure 1:
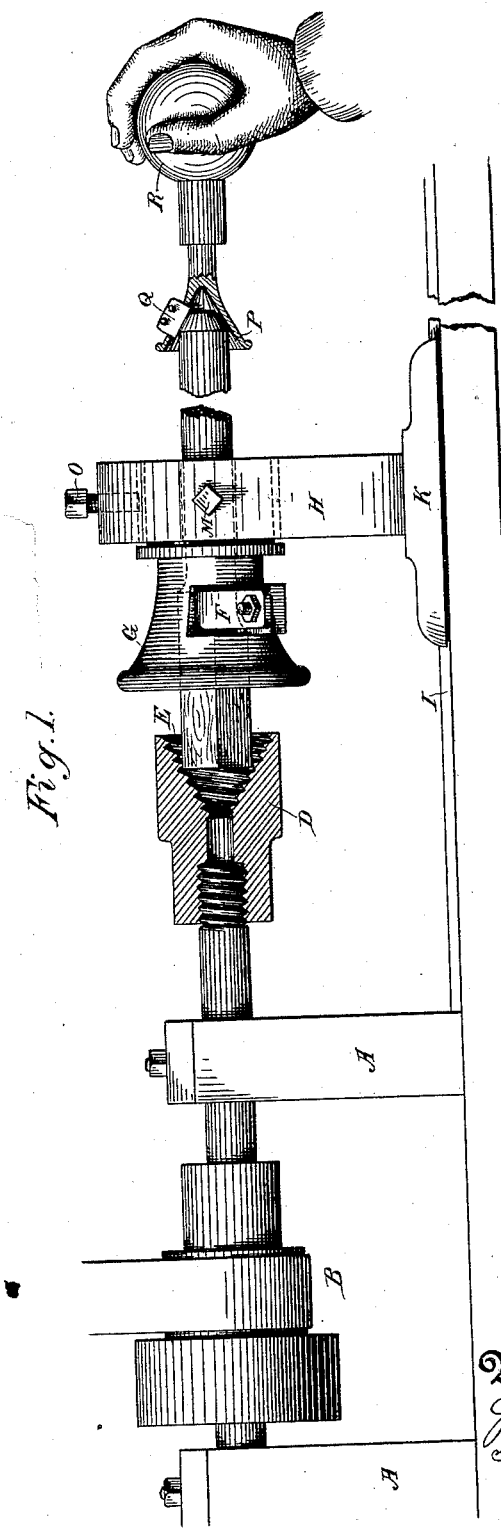
Figure 2:
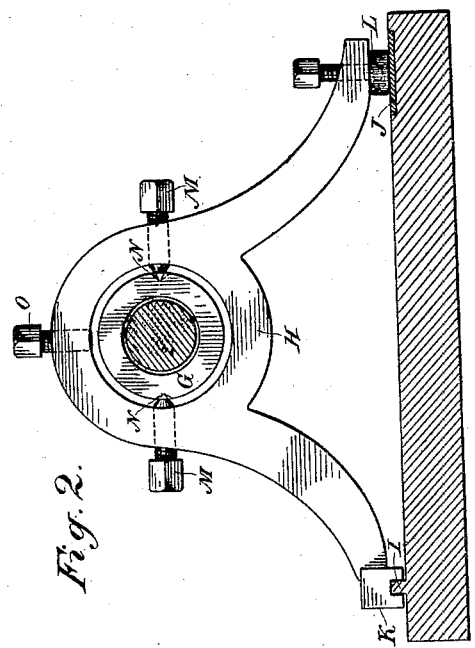

Figure 1 is a side elevation of the lathe with my improvements, also showing the supplemental hand-tool. Fig. 2 is an end view of the movable tail-block, showing the automatic adjustment for irregular pieces.

In the turning of treenails or similar articles in which it is desirable to do the work speedily considerable delay occurs, because it is necessary to stop the lathe after each one is finished and remove it and place a new one in to be turned, after which the lathe must be started.

My invention consists of a chuck by which the square pieces from which the treenails are turned can be instantly seized and released while the lathe is in motion, and an adjustable traveling cutter by which the square strips are turned into cylindrical form, with the exception of the head, which is held in the chuck, said cutter being self-adjusting, so as to adapt itself to strips which may be warped or not perfectly straight.

A are the standards of the head-block of the lathe, having the driving cone-pulley B journaled so as to rotate between them in the usual manner, this pulley being driven by a belt from a counter-shaft. To the end of the lathe-spindle C is attached the chuck or holder D, the interior of which is made in the form of an obtuse cone having screw-threads cut in it, as shown at E. These screw-threads are made sharp-edged, so that they will engage any piece of wood which may be presented, and will draw it into the threads until, by reason of the taper or decreasing size of the cone, it becomes firmly fixed, so that it cannot be turned around or moved inward any farther.

The cutter or chisel F is fixed so as to project through the side of a stationary cutter head or piece, G, the opening of which is made bell-mouthed, so that the end of the stick which is presented may pass into the bell-mouth and be acted upon by the cutting-chisel F, which will then turn it in a cylindrical form, the stick passing out through the rear portion of the head G until the face or flange of the latter comes in contact with the chuck or holder D, which limits the movement and finishes the cylindrical treenail up to the head, which is to be left square and which is fixed within the holder D.

The cutter-head G is fixed upon the tail-stock or frame H, which travels on the raised front rail, I, and upon the flat rear track, J, having a grooved block or guide, K, fitting the front rail, while an elastic cushion or block, L, fits upon the track J, over which it slides. This elastic cushion or block, traveling upon the flat rail J, moves with comparatively little noise and friction and prevents the tail-stock from binding or sticking when it is moved backward and forward by taking hold of the front.

The grooved or channeled guide K is long enough so that the tail-stock H may be moved backward and forward upon the guiding-rails to cause it to approach to the holder D and recede from it easily by simply pushing with the hand.

In order to accommodate the cutter-head G to sticks which may have been warped out of shape, so that they are not entirely straight, the head is fitted in a cylindrical socket made in the tail-piece H, which is of larger diameter than the head G. Through the opposite sides of the tail-piece H, and radially with the axis of the cutter-head G, are fixed screws M, which are pointed at their inner ends, so as to enter shallow countersunk openings N in the sides of the head G, and this allows the head to oscillate and conform itself to the irregular movements of the curved or warped stick which may be in process of turning. If it is desired to fix the head firmly and prevent this automatic adjustment, it is done by means of a third screw, O, at the top of the frame H, which serves to hold the head G firmly when screwed down upon it.

In order to chamfer or bevel the angles at the point of the treenail, I employ a hand-tool, which consists of a conical socket, P, having a cutter or blade, Q, adjustably fixed within it, and this tool has a knob or handle, R, by which it may be grasped in one hand, so that it can be held for an instant against the revolving treenail while the cutter-head G is being made to travel up toward the holder D, and the point is thus finished while the turning of the body of the treenail is progressing. As soon as the cutter-head G has been moved up so as to strike against the holder D, it is immediately drawn back clear of the outer end of the treenail and the latter is raised slightly with the hand, which will take it out of the holder without stopping the rotation of the latter. Another square stick or piece is introduced by simply putting the end inside the holder D, and when the cutter-head is pressed against it it secures itself into the holder sufficiently to remain fast while it is being turned.

It will be manifest that this chuck is adapted to hold any form of work and for various purposes.

Having thus described my invention, what I claim as new, and desire to secure by Letters Patent, is—

1. The head or chuck secured to the driving-pulley spindle and having the screw-threaded conically-shaped socket for holding the end of the article to be turned, in combination with the sliding tail-stock and the bell-mouthed cutter-head mounted within the tail-stock, so as to adapt itself to the irregularities or curvatures of the article to be turned, substantially as herein described.

2. The sliding tail-stock having the front channeled guide running upon the raised track I, and the rear foot provided with the flat elastic block L, which travels upon the corresponding flat rail at the rear of the lathe, substantially as herein described.

3. The tail-stock having the sliding channeled guide in front and the elastic block traveling upon a flat rail at the rear, the raised track, and the bell-mouthed cutter-head with trunnions for an automatic adjustment within its support, in combination with the revolving head or holder having the conical screw-threaded socket to receive and hold the end of the article to be turned, substantially as herein described.

In witness whereof I have hereunto set my hand.

FINDLAY CUMMING.

Witnesses:
S. H. NOURSE,
H. C. LEE.